United States Patent [19]

Paul

[11] 4,146,249
[45] Mar. 27, 1979

[54] INDEPENDENT WHEEL SUSPENSION FOR MOTOR VEHICLES

[75] Inventor: Manfred Paul, Korntal, Fed. Rep. of Germany

[73] Assignee: Daimler-Benz Aktiengesellschaft, Fed. Rep. of Germany

[21] Appl. No.: 842,380

[22] Filed: Oct. 11, 1977

[30] Foreign Application Priority Data

Oct. 30, 1976 [DE] Fed. Rep. of Germany ....... 2649990

[51] Int. Cl.² .......................................... B60G 11/18
[52] U.S. Cl. .................................... 280/700; 280/721
[58] Field of Search ............... 280/690, 695, 700, 717, 280/721, 723; 267/11, 66

[56] References Cited

U.S. PATENT DOCUMENTS

| | | | |
|---|---|---|---|
| 2,794,632 | 6/1957 | Schilberg | 280/721 |
| 3,037,789 | 6/1962 | Allison | 280/695 |
| 3,292,944 | 12/1966 | Danganthier | 280/695 |
| 3,486,575 | 12/1969 | Allison | 280/721 |
| 3,990,725 | 11/1976 | Allison | 280/700 |
| 3,992,036 | 11/1976 | Allison | 280/695 |

*Primary Examiner*—Robert R. Song
*Attorney, Agent, or Firm*—Craig & Antonelli

[57] ABSTRACT

An independent wheel suspension for motor vehicles, especially for passenger motor vehicles, which, with respect to a vehicle axle, includes at least one triangular guide-like wheel guide member retained on the side of the body in two elastic pivotal connections and an approximately U-shaped stabilizer which is elastically pivotally connected on the side of the body within the area of its web disposed between its arms extending generally in the vehicle longitudinal direction; the wheel guide members which belong to the two sides of the vehicle are thereby secured on the side of the body at the web of the stabilizer by way of one of their mutually corresponding pivotal connections.

23 Claims, 1 Drawing Figure

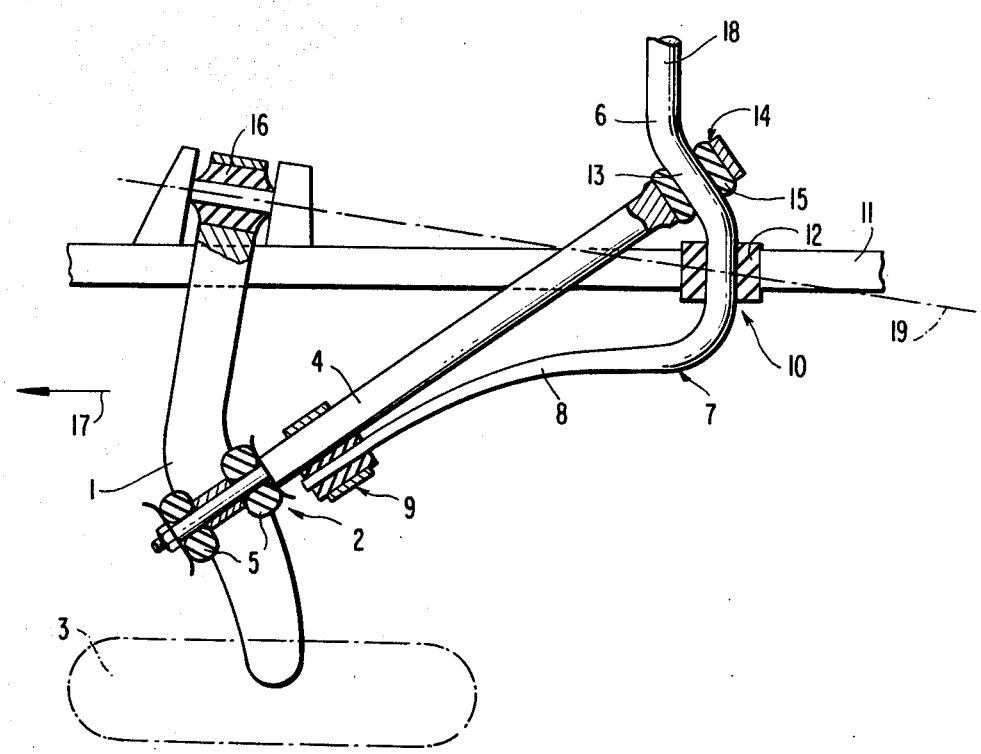

INDEPENDENT WHEEL SUSPENSION FOR MOTOR VEHICLES

The present invention relates to an independent wheel suspension for motor vehicles, especially for passenger motor vehicles, including with respect to a vehicle axle, at least one triangular guide-like wheel guide member per vehicle side retained on the side of the body in two elastic pivotal connections, and a U-shaped stabilizer which is elastically pivotally connected on the side of the body within the area of its web disposed between its arms extending in the vehicle longitudinal direction.

With such wheel suspension, it is always difficult to harmonize the requirements for as accurate as possible a wheel guidance, on the one hand, and for as great as possible a comfort, on the other. This is so as an exact wheel guidance requires pivotal connections as free of play as possible whereas for comfort reasons, one aims at as far-reaching as possible a yieldingness of the pivotal connections.

Heretofore, one has attempted especially for vehicles of the higher comfort class to bring into harmony the contradictory requirements in that one has coordinated the points of pivotal connection of the wheel guide members on the side of the body at least partially to a so-called drive stool which was arranged as intermediate member between the body and the wheel suspension and which, in its turn, was additionally elastically supported with respect to the body so that a series connection of elasticities resulted. It was possible, on the one hand, by this series connection to keep the elasticity coordinated to the respective pivotal connection harder without impairing the comfort. On the other hand, by a corresponding construction and location of the respective pivotal connections especially between the "drive stool" and the body, also the self-steering behavior of the wheel suspension conditioned by the elasticities could be suppressed to a certain degree, or could even be influenced with a view toward the attainment of a predetermined desired driving behavior of a vehicle equipped with such a wheel suspension. However, the not inconsiderable expenditure which was conditioned alone already by the use of a drive stool as intermediate member always stood opposite as disadvantage to these advantages.

The present invention is therefore concerned with the task to provide a solution in which the aforementioned disadvantages can be eliminated at least far-reachingly without negative influence on driving behavior and driving comfort.

According to the present invention, this is achieved with an independent wheel suspension of the aforementioned type in that the wheel guide members belonging to two different vehicle sides are secured on the side of the body at the web of the stabilizer by way of one of their mutually corresponding pivotal connections. With such a construction according to the present invention, an indirect pivotal connection is made possible for a part of the pivotal connections of the wheel guide members on the side of the body without thereby necessitating an additional intermediate member, for example, in the form of a drive stool. Consequently, the advantages of known wheel suspensions with a drive stool are attainable in the solution according to the present invention without the use of such a drive stool, which leads to a saving in space and especially also to a considerable saving in weight and costs.

It is appropriate in one embodiment of the present invention if divided triangular guide members with a cross guide member and a longitudinal guide member extending essentially in the vehicle longitudinal direction and movably connected with the cross guide member are provided as wheel guide members. It has thereby proved as appropriate to mount the longitudinal guide member elastically at the cross guide member. The longitudinal guide member may thereby be directed forwardly or rearwardly from the cross guide member and may thus serve as tension or compression rod.

A construction has thereby proved as especially appropriate in which the longitudinal guide member is directed toward the rear and is secured thereat within the area between the pivotal connections of the stabilizer on the side of the body at the web thereof.

Accordingly, it is an object of the present invention to provide an independent wheel suspension for motor vehicles which avoids by simple means the aforementioned shortcomings and drawbacks encountered in the prior art.

Another object of the present invention resides in an independent wheel suspension for motor vehicles, especially passenger motor vehicles which enables by simple structural means a very exact wheel guidance without impairment of the driving comfort.

A further object of the present invention resides in an independent wheel suspension for passenger motor vehicles which reduces the cost as well as the weight thereof without sacrifice in the preciseness of the wheel guidance or the driving comfort.

Still a further object of the present invention resides in an independent wheel suspension for motor vehicles, especially for passenger motor vehicles, in which an indirect pivotal connection of the wheel guide members is possible in effect without requiring any extra parts in the suspension thereof.

Another object of the present invention resides in an independent wheel suspension for motor vehicles which not only excels by great preciseness of the wheel guidance as well as high comfort for the passengers but also by considerable savings in space and weight.

These and other objects, features and advantages of the present invention will become more apparent from the following description when taken in connection with the accompanying drawing which shows, for purposes of illustration only, one embodiment in accordance with the present invention, and wherein:

The single FIGURE is a schematic plan view on a wheel suspension according to the present invention.

Referring now to the single FIGURE of the drawing which represents a plan view on the left axle half of an independent wheel suspension constructed symmetrically with respect to the center of the vehicle, appropriate especially for front wheel suspensions, reference numeral 1 designates therein the cross guide member of a triangular guide-like wheel guide member generally designated by reference numeral 2 which can be used especially as lower cross guide member of a double guide member axle. That is, the double guide member axle includes respective transverse guide means 1 at each of the respective sides of the vehicle.

The cross guide member 1 is connected with the wheel 3 in any conventional manner (not shown), for example, by means of a wheel carrier, and is supported in the vehicle longitudinal direction near its end on the side of the wheel by way of a longitudinal guide member which is designated by reference numeral 4 and which is constituted in the illustrated embodiment by a strut or rod that is pivotally connected at the cross guide member 1 by way of elastic bearing elements 5 so as to be movable within predetermined limits. That is, the longitudinal guide member 4 is connected at its forward end on the cross guide member 1 by way of elastic connection 5. At its end opposite the cross guide member 1, the longitudinal guide member 4 which in the illustrated embodiment extends from the cross guide member 1 toward the rear and obliquely inwardly, is elastically pivotally connected at the web 6 of a U-shaped stabilizer generally designated by reference numeral 7 whose arms 8, in their turn, are elastically connected with the longitudinal guide member 4 within the area of their free ends and more particularly near the pivotal connection of the longitudinal guide member 4 at the cross guide member 1. The elastic connection between the arms 8 of the stabilizer 7 and the respective longitudinal guide member 4 is generally designated in the drawing by reference numeral 9 and is formed in the illustrated embodiment by an elastic bearing element into which the respective arm 8 projects with its free end.

The stabilizer 7, in its turn, is elastically pivotally connected on the side of the body near the transition into its arms 8 at a location generally designated by reference numeral 10, whereby this pivotal connection in the illustrated embodiment is preferably coordinated to a longitudinal bearer 11 of the body of the vehicle, which is not further illustrated, and is formed by an elastic bush 12, whose axis extends in the vehicle transverse direction.

Adjoining its section guided in the bush 12 and extending in the vehicle transverse direction, the web 6 is provided with a section 13 which, in the illustrated embodiment, is slightly angularly bent off obliquely toward the front and extends approximately perpendicularly to the longitudinal axis of the longitudinal bearer 5. An extension which is approximately perpendicular to the longitudinal axis of the longitudinal guide member 4, thus results for the elastic pivotal connection generally designated by reference numeral 14 of the longitudinal guide member 4 at the section 13 of the web 6. The elastic pivotal connection 14 is formed by an elastic bush 15 surrounding the stabilizer 7 within the area of the section 13.

Since with the illustrated wheel suspension according to the present invention, the longitudinal guide member 4 essentially absorbs the longitudinal forces and, in relation to brake forces, is located to the rear of the wheel center with the illustrated arrangement of the stabilizer 7 shown herein and acts as compression rod or strut, the elastic bearing provided in the pivotal connection of the cross guide member 1 with respect to the body may be constructed relatively soft in the vehicle transverse direction.

In the illustrated embodiment, in which the elastic pivotal connection of the cross guide member 1 in the body, which is formed by the bearing 16, lies barely inside of the longitudinal guide member and with respect to its axis of rotation is inclined obliquely forwardly and inwardly by about 10° to the vehicle longitudinal direction, the elastic pivotal connection of the stabilizer 7 is coordinated to the longitudinal guide member 4, whereby the axis of rotation of the bush 12 extends in the vehicle transverse direction. The section 13 of the stabilizer 7 is inclined with respect to the vehicle transverse direction under an angle of about 35° open toward the front (arrow 17), whereby the longitudinal strut 4 is mounted at the stabilizer 7 on the section 13 in direct proximity of the elastic pivotal connection 10 by way of the elastic pivotal connection 14. Adjoining the section 13, the stabilizer 7 again passes over into a section extending in the cross direction and designated by reference numeral 18.

With the indicated location of the pivotal connections, an axis of rotation results overall for the illustrated triangular guide member which is inclined forwardly and inwardly under an angle of about 10°, this axis being designated by reference numeral 19. With the extension of the axis of rotation 19 as shown in the drawing, this axis of rotation extends through the center point of the bearing of the cross guide member and through the center point of the corresponding pivotal connection of the stabilizer on the side of the body.

An alternative contemplated embodiment with the longitudinal guide member directed forwardly would be similar to the illustrated embodiment, assuming showing of the right hand side of the vehicle with a travel direction opposite to arrow 17.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all those changes and modifications as are encompassed by the scope of the appended claims.

I Claim:

1. An independent wheel suspension for motor vehicles, comprising, with respect to a vehicle axle, at least one triangular guide-like wheel guide means for each vehicle side retained on the side of the body in elastic pivotal connecting means, and an approximately U-shaped stabilizer means which is elastically pivotally connected on the side of the body within the area of its web disposed between its arms extending generally in the vehicle longitudinal direction, characterized in that the wheel guide means belonging to the respective vehicle sides are secured on the respective side of the body at the web of the stabilizer means by way of respective pivotal connecting means.

2. A wheel suspension according to claim 1, characterized in that the motor vehicle is a passenger motor vehicle and the suspension is a front wheel suspension.

3. A wheel suspension according to claim 1, characterized in that the wheel guide means include each a triangular guide like guide means having a cross guide member and a longitudinal guide member extending essentially in the vehicle longitudinal direction and movably connected with the cross guide member.

4. A wheel suspension according to claim 3, characterized in that the longitudinal guide member is elastically pivotally connected at the cross guide member.

5. A wheel suspension according to claim 4, characterized in that the longitudinal guide member is elastically pivotally connected at the stabilizer means.

6. A wheel guide suspension according to claim 4, characterized in that the longitudinal guide member extends rearwardly from the cross guide member.

7. A wheel suspension according to claim 4, characterized in that the longitudinal guide member extends forwardly from the cross guide member.

8. A wheel suspension according to claim 4, characterized in that the longitudinal guide members are pivotally connected at the stabilizer means intermediate the pivotal connecting means of the stabilizer means on the side of the body.

9. A wheel suspension according to claim 8, characterized in that the longitudinal guide member is supported on a section of the web of the stabilizer means which extends approximately perpendicularly to the extension of the longitudinal guide member.

10. A wheel suspension according to claim 9, characterized in that the stabilizer arms are elastically pivotally connected at the longitudinal guide members.

11. A wheel suspension according to claim 10, characterized in that the triangular guide-like guide means has an effective axis of rotation which extends at an angle to the longitudinal direction of the vehicle.

12. A wheel suspension according to claim 11, characterized in that said axis of rotation extends obliquely inwardly in the direction toward the corresponding vehicle end.

13. A wheel suspension according to claim 12, characterized in that said angle is of the order of about 10°.

14. A wheel suspension according to claim 13, characterized in that the section of the stabilizer web is inclined to the vehicle transverse direction at an angle of about 35°.

15. A wheel suspension according to claim 14, characterized in that the longitudinal guide member extends rearwardly from the cross guide member.

16. A wheel suspension according to claim 14, characterized in that the longitudinal guide member extends forwardly from the cross guide member.

17. A wheel suspension according to claim 3, characterized in that the longitudinal guide members are pivotally connected at the stabilizer means intermediate the pivotal connecting means of the stabilizer means on the side of the body.

18. A wheel suspension according to claim 3, characterized in that the longitudinal guide member is supported on a section of the web of the stabilizer means which extends approximately perpendicularly to the extension of the longitudinal guide member.

19. A wheel suspension according to claim 18, characterized in that the section of the stabilizer web is inclined to the vehicle transverse direction at an angle of about 35°.

20. A wheel suspension according to claim 3, characterized in that the stabilizer arms are elastically pivotally connected at the longitudinal guide members.

21. A wheel suspension according to claim 1, characterized in that the triangular guide-like guide means has an effective axis of rotation which extends at an angle to the longitudinal direction of the vehicle.

22. A wheel suspension according to claim 21, characterized in that said axis of rotation extends obliquely inwardly in the direction toward the corresponding vehicle end.

23. A wheel suspension according to claim 21, characterized in that said angle is of the order of about 10°.

* * * * *